United States Patent [19]

Wei

[11] Patent Number: 4,703,687

[45] Date of Patent: Nov. 3, 1987

[54] COFFEE MAKER

[76] Inventor: Yung-Kuan Wei, No. 8, Lane 907, SEc. 2, Pen Tien St., Tainan, Taiwan

[21] Appl. No.: 871,459

[22] Filed: Jun. 5, 1986

[51] Int. Cl.$^4$ ............................................. A47J 31/42
[52] U.S. Cl. ......................................... 99/286; 99/287
[58] Field of Search ............... 99/279, 286, 295, 280, 99/281, 282, 284, 287, 289 R, 305; 426/433; 241/101.2, 258

[56] References Cited

U.S. PATENT DOCUMENTS

| | | | |
|---|---|---|---|
| 3,107,600 | 10/1963 | Brun-Buisson | 99/286 |
| 3,327,615 | 6/1967 | Swan | 99/286 |
| 3,967,546 | 7/1976 | Cailliot | 99/286 |
| 4,196,658 | 4/1980 | Takagi | 99/286 |
| 4,624,177 | 11/1986 | Ito | 99/286 |
| 4,641,572 | 2/1987 | Varga | 99/286 |

Primary Examiner—Robert W. Jenkins
Attorney, Agent, or Firm—Morton J. Rosenberg

[57] ABSTRACT

A coffee maker comprising a main housing separated into a water reservoir and a water tube chamber having an extending portion for mounting a coffee pot thereon, an auxiliary housing integral with the main housing to mount a coffee bean container thereon, a coffee bean feeding means partially extending into the coffee bean container and being actuated by an electromagnetic element, a circular housing fastened onto the auxiliary housing and inserted within a brewing basket, a filter ring mounted within the brewing basket under the dripping ring, a stationary grinding element rigidly mounted within the brewing basket, a coffee bean grinding means being right under an socket and actuated by a motor, a water tube with a heating coil sleeved thereon in the water tube chamber, and a power supply.

1 Claim, 4 Drawing Figures 4,703,687

COFFEE MAKER

BACKGROUND OF THIS INVENTION

This invention relates to a coffee maker, particularly to a drip coffee maker.

Conventionally, the coffee maker performs the brewing function alone. The grinding of coffee beans is assigned to a grinding machine. It is the defect of the conventional art that the grinding function and brewing one are divided into two processes.

One object of this invention is to provide a coffee maker which combines the grinding and brewing functions into one process.

Other objects, merits and a fuller understanding of the present invention will be obtained by those having ordinary skill in the art when the following detailed description of the best mode contemplated for practicing the invention is read in conjunction with accompanying drawings wherein like numerals refer to like or similar parts and in which:

DETAILED DESCRIPTION OF THIS INVENTION

This invention relates to a coffee maker, particularly to a drip coffee maker.

Figure 1:
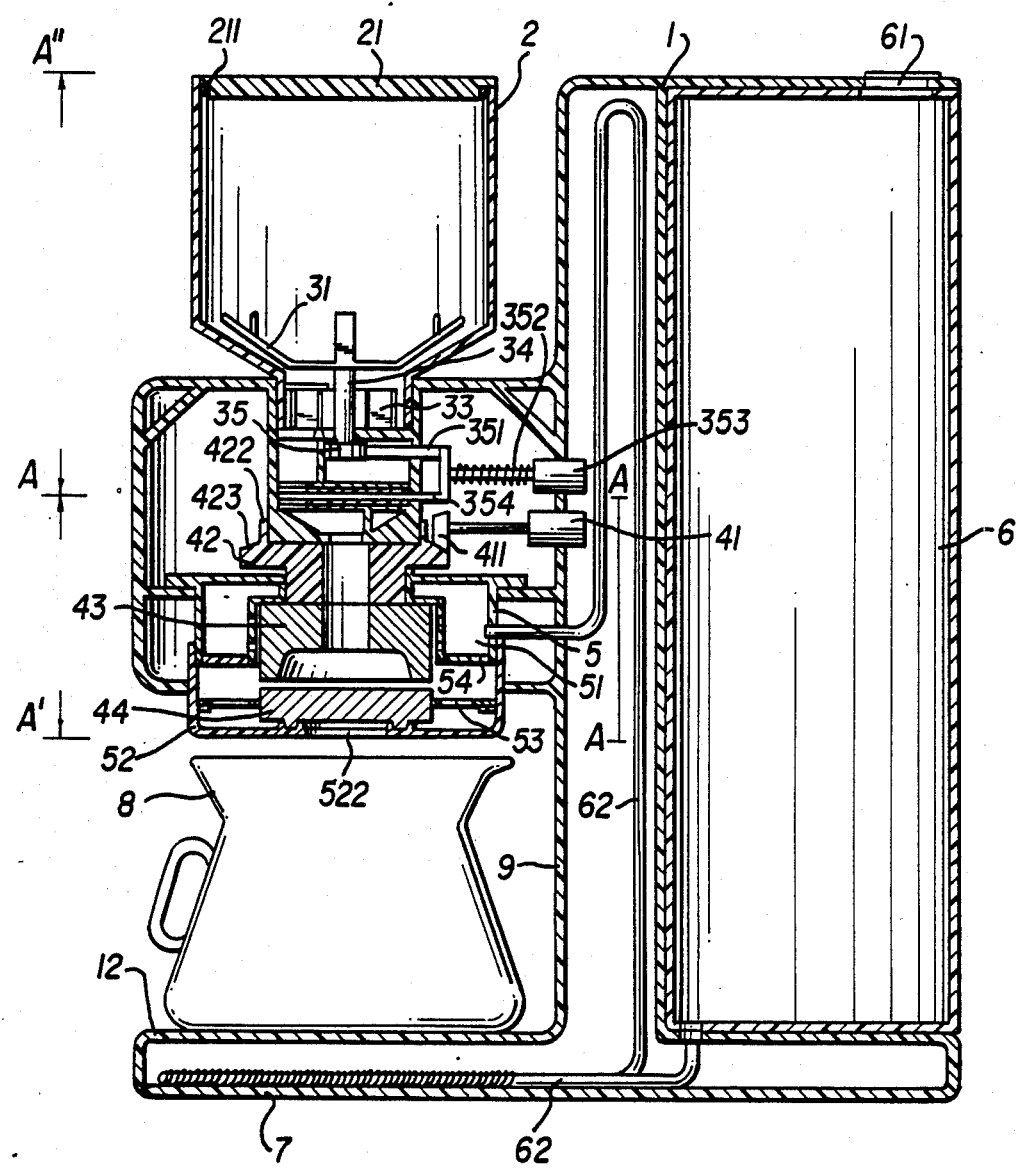
FIG. 1 is a longitudinally sectional view of a preferred embodiment of this invention.
Figure 2:
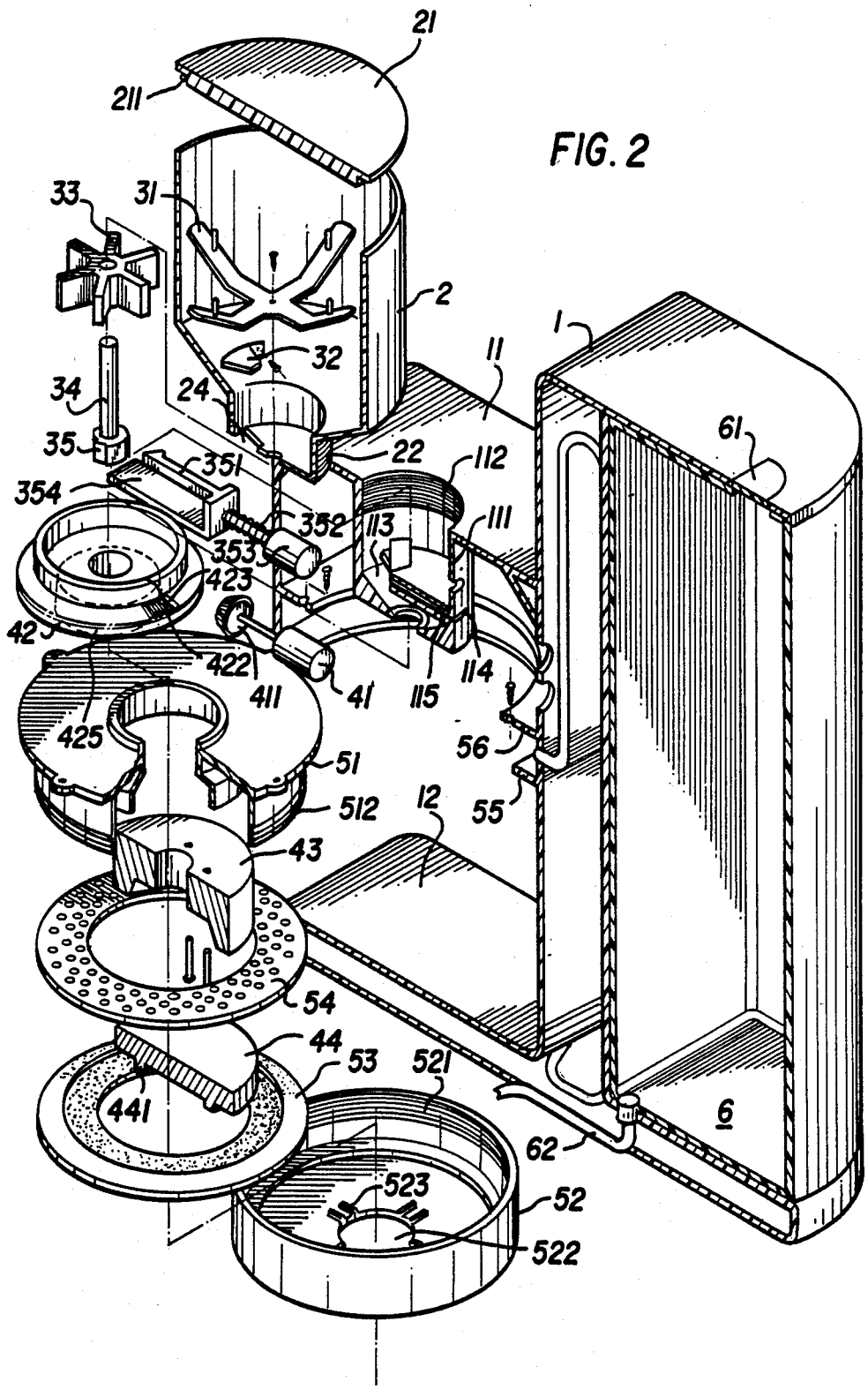
FIG. 2 is a prospective view of a preferred embodiment of this invention, partially dissembled and taken off.
Figure 3:
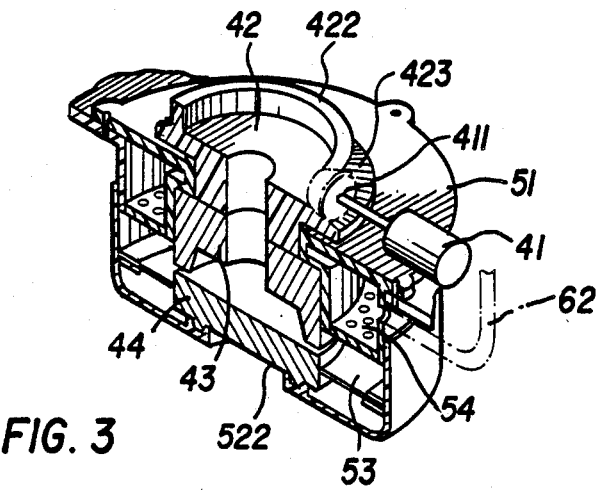
FIG. 3 is a prospective view of A—A' of FIG. 1, partially sectional.
Figure 4:
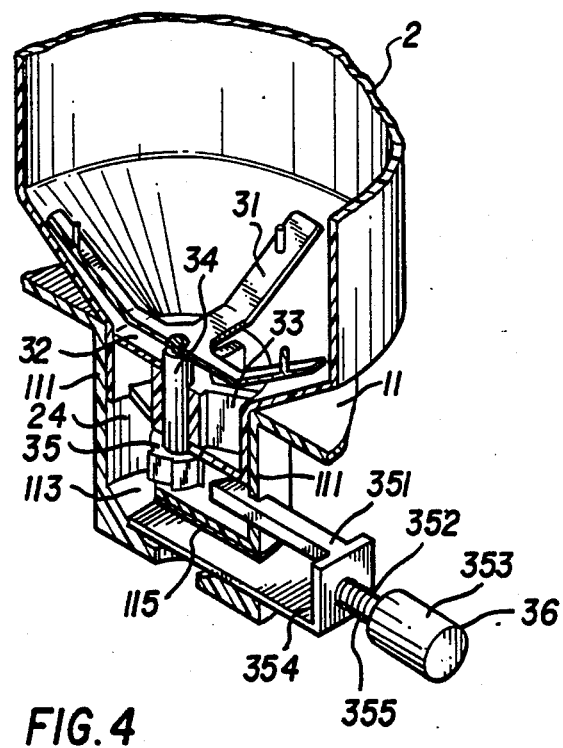
FIG. 4 is a prospective view of A—A" of FIG. 1, partially sectional.

As shown in FIGS. 1, 2 & 3, a preferred embodiment of this invention comprises a main housing 1 and an auxiliary housing 11, both being integrally made. The main housing 1 is separated into a water reservoir 6 and a water tube chamber 9. Particularly as shown in FIG. 2, the auxiliary housing 11 extends horizontally from approximately the middle portion of the wall of the water tube chamber 9. The water tube chamber 9 has a bottom portion 12 extending outward in parallel to the auxiliary housing 11 for a coffee pot 8 to put thereon. The auxiliary housing 11 comprises a bottom inward rim 55, an intermediate inward rim 56 above the bottom inward rim 55 and a socket 111 above the intermediate inward rim 56. As shown in FIGS. 2 & 4, the lowest portion of socket 111 is a basin 113 the center of which is perforated for coffee beans to fall therethrough. The socket 111 is provided with a female thread 112 at the upper portion thereof. Two slots 114 are provided on the periphery of the socket 11 at the portion facing the water tube chamber 6. At the upper edge of the lower slot 114 is integrally provided a separating disc 116 which has an opening for the coffee beans to fall therethrough, however, at the lower edge of the lower slot 114 is a washer 115 for sealing off the vapour. A coffee bean container 2 is provided with a male thread 22 at the lower portion to engage with the female thread 112 of the socket 11. The bottom portion of the coffee bean container 2 is perforated at the center for a shaft 34 of a rachet 35 to extend therethrough. As shown, a star shaped solid 33 preferrably having six teeth is sleeved on the shaft 34. Screwed on top of the shaft 34 is paddle blades 31. As shown in FIG. 2, a closing plate 32 is fastened on the periphery of inner space defined by the threaded portion of the coffee bean container 2. The number of the teeth of the star shaped solid 33 equals to that of the rachet 35 as a result of which the star shaped solid 33 and the rachet 35 will move synchronously one pitch at one intermittent motion. The volume of the closing plate 32 covers the space defined by any two teeth of the star shaped solid 33, thus enabling the coffee beans stirred by the paddle blades 31 to fall through the opening 24 and further through the perforation of the socket 2. A cover 21 provided with a washer 211 on the peripherical edge is placed on top of the coffee bean container 2. A catching device 36 comprises a pawl 351 extending through the upper slot 114 to engage with the rachet 35, a sealing plate 354, and a guiding stem 355 extending beyond the pawl 351 the sealing plate 354 cooperating with the washer 115 to ensure sealing off the vapour, an electromagnetic element 353 on the outmost end of the guiding stem 355 and a spring 352 between the electromagnetic element 353 and both of the pawl 351 and sealing plate 354. When the electromagnetic element 353 is in an on position, the pawl 351 will catch the ratchet 35 and press the spring 352. In an intermittent motion, the rachet 35 and the star shaped solid 33 will respectively move one pitch.

As shown in FIGS. 1, 2 & 3, a circular housing 51 is fastened on the intermediate inward rim 56. The circular housing 51 being hollow in the center comprises an inner peripherical wall (not given a reference number) and outer peripherical wall (not given a reference number). The outer peripherical wall of the circular housing 51 is provided a male thread 512 at the lower portion to engage with a female thread 521 provided on the inner periphery of a brewing basket 52 which has a discharge opening 522 approximately at the center thereof. The brewing basket 52 is provided an inward rim 523 on the inward peripherical wall under the female thread 521 for a filter ring 53 to mount thereon and a plurality of grooves 523 for a stationary grinding element 44 to insert thereon by means of the flanges 441 provided under the stationary grinding element 44. Upon the stationary grinding element 44 is a rotating grinding element 43 which is fastened onto a rotator 42. The rotator 42 being hollow in the center integrally comprises a circular flange 422 the diameter of which is slightly greater than that of the socket 111, a gear wheel 424 provided wth bevel gears thereon and a lower circular solid 425 the diameter of which is slightly smaller than that of the hollow portion of the circular housing 51. The stationary grinding element 43 is hollow in the center thereof and bossed at the lower portion thereof to allow the coffee beans to gather there and then be ready for grinding. In mesh with the bevel gears 423 is a pinion 411 which is rotated by a motor 41. As shown in FIG. 1, one end of a water tube 62 communicates with the water reservoir 6 and the other end with the brewing chamber defined by circular housing 51 and the dripping ring 54. Within the water tube 62 under the bottom seat 12 is sleeved a heating coil 7. The electromagnetic solid 38, motor 41 and the heating coil 7 are connected to a power supply. Thus, when the electromagnetic element 353 is in an on position, the rachet 35 and the star shaped solid 33 will run a pitch in one intermittent motion to let the coffee beans to fall. The motor 41 in on position will further drive the rotator 42 and the rotating grinding element 43 to rotate in relation to the stationary grinding element 44. The water in the water tube 62 is heated by the heating coil 7 to become vapour which flows into the brewing chamber defined by the circular housing 51 and the dripping ring 54. The vapour will drip through the perforations provided on the dripping ring 54 to mix with the finely ground coffee powder and then drip out of the discharge opening 522 into the coffee pot 8.

It is to be noted that the above description is made for exlaining however not for limiting the concept of this invention.

What I claim:

1. A coffee maker comprising:

a main housing separated into a water reservoir and a water tube chamber having an extending portion for mounting a coffee pot thereon;

an auxiliary housing integral with said main housing, said auxiliary housing being above said coffee pot;

a socket provided on the center of said auxiliary housing for a coffee bean container to mount thereon;

a ratchet extending with a shaft into said coffee bean container;

a star shaped solid sleeved on said shaft, paddle blades fastened onto top of said shaft;

a catching device having a linearly displaceable pawl member, said pawl member being displaceably actuated by an electromagnetically driven element;

a circular housing fastened onto an intermediate inward rim on the inner peripherical wall of said auxiliary housing;

a dripping ring inserted within said circular housing;

a brewing basket for said circular housing to mount thereon;

a filter ring mounted within said brewing basket above said dripping ring;

a stationary grinding element rigidly mounted on said brewing basket;

a rotating grinding element fastened onto a rotator having bevel gears in mesh with a pinion actuated by a motor, said rotator being inserted within said circular housing at one end and allowing said socket to insert therein at the other end;

a water tube in said water tube chamber to communicate said water reservoir and said circular housing;

a heating coil sleeved on said water tube, and a power supply connected with said electromagnetically driven element, said motor and said heating coil.

* * * * *